June 29, 1965 H. R. SIEBACH ETAL 3,191,432
ARTICLE BENDING TEST FIXTURE
Filed Dec. 8, 1961 2 Sheets-Sheet 1
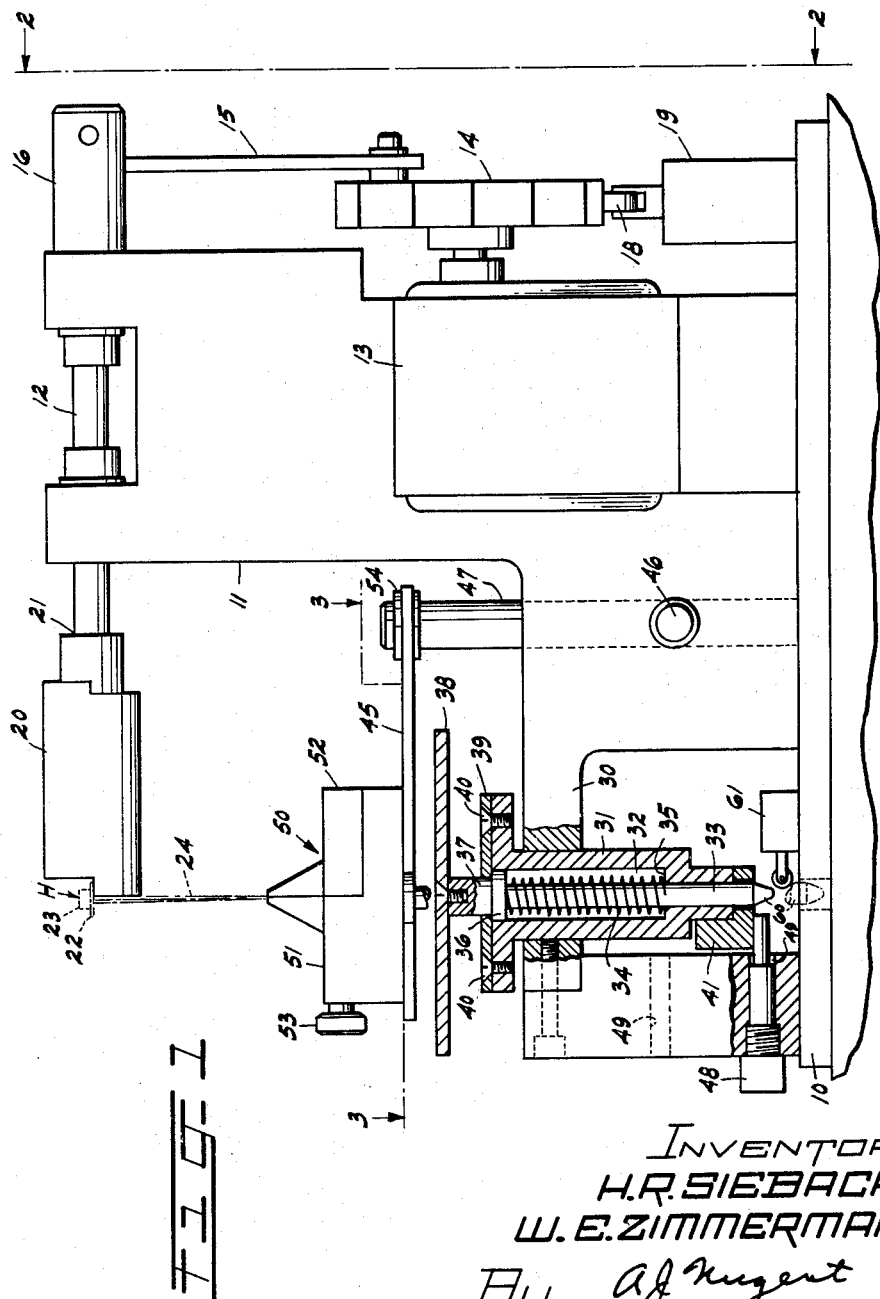
INVENTORS
H. R. SIEBACH
W. E. ZIMMERMAN
By A. J. Nugent
ATTORNEY

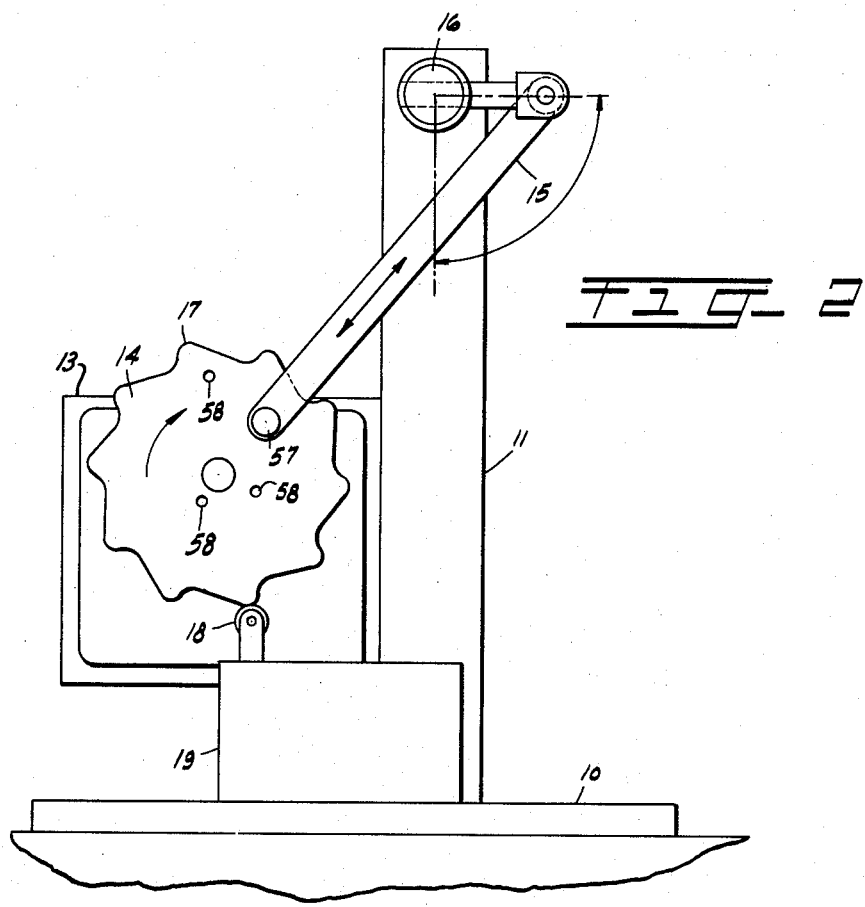
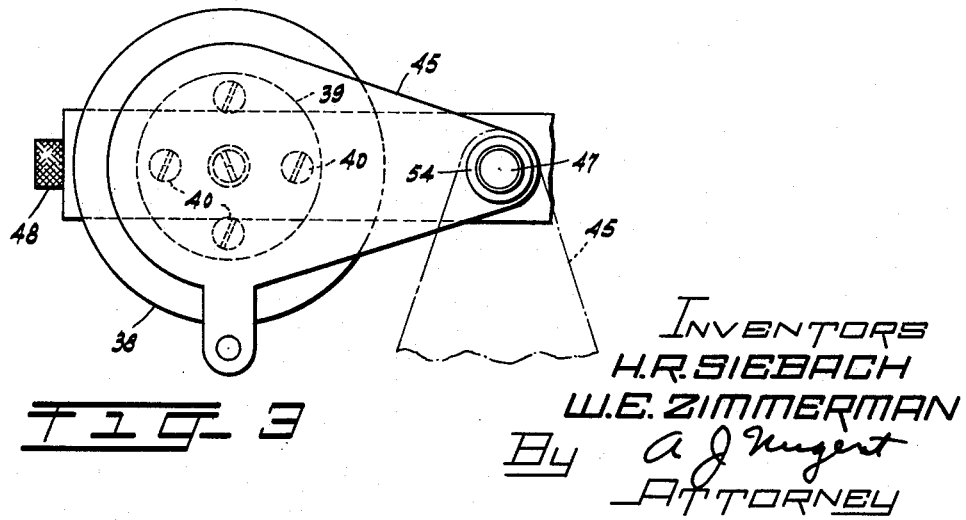

United States Patent Office 3,191,432
Patented June 29, 1965

3,191,432
ARTICLE BENDING TEST FIXTURE
Henry R. Siebach, Wyomissing, and Walter E. Zimmerman, Laureldale, Pa., assignors to Western Electric Company Incorporated, New York, N.Y., a corporation of New York
Filed Dec. 8, 1961, Ser. No. 158,139
6 Claims. (Cl. 73—91)

This invention relates to bend test fixtures and particularly to a test fixture utilized to perform a destructive bend test on an article, such as the leads of a semiconductor device.

In the manufacture of semiconductor devices, particularly those located in inaccessible units such as underwater cables, missiles, satellites, etc., thereby demanding long life, some a minimum of twenty-five years, it is mandatory that these devices be accurately tested to insure their reliability. One of the components of a semiconductor device requiring such a test is the wire leads serving as electrodes.

Heretofore, the destructive bend tests of such leads were made in an unprecise manner and inaccurate measurements resulted. For instance, it was quite difficult to repeatedly bend the lead at the same angle during testing, and to accurately record the number of bends obtained prior to a fracturing of the tested lead under test.

Accordingly, the object of the invention is a fixture for performing a destructive bend test of elongated articles in an efficient and accurate manner.

With this and other objects in mind, the present invention contemplates a fixture wherein the article is held at one end by a holding device and has connected to its other end a suspended weighted unit which applies a prescribed tensile force to the lead. The holding means is oscillated through a predetermined angle to repeatedly bend the article back and forth, the number of article bends automatically being recorded. Upon the fracture of the article, the weighted unit drops upon a mechanism which, in turn, stops the automatic recording of the bends.

In a preferred embodiment, the fixture includes a shaft with an interchangeable adaptor connected at one end for holding the lead to be tested. The weighted unit is connected to the other end of the lead and is suspended over a spring-loaded platform. The shaft is oscillated through a desired angle to bend the lead, and upon the fracture thereof, the weighted unit drops on the spring-loaded platform causing a plunger pin depending therefrom to contact a switch which stops a counter mechanism recording the number of lead bends.

Other objects, advantages and features of the invention will be apparent and a fuller understanding of the invention may be had by referring to the following description of a specific embodiment thereof, taken in conjunction with the accompanying drawings, in which:

FIG. 1 is a side view of the test fixture with portions broken away to reveal structural details;

FIG. 2 is a view taken along line 2—2 of FIG. 1; and

FIG. 3 is a view taken along line 3—3 of FIG. 1.

Referring now to the drawing, the fixture includes a base 10 upon which is mounted a support 11 for holding a shaft 12. The shaft is driven by a motor 13 through a cam wheel 14 and eccentric linkage 15 connected to its back end portion 16, the linkage translating the rotary motion of the motor into an oscillating motion of the shaft. The cam wheel 14 is provided with a plurality of projecting nibs 17, in this instance ten, which successively strike a limit switch 18 which, in turn, pulses a counter 19 to record the number of cycles through which the shaft has oscillated during a particular test.

An interchangeable adaptor 20, for holding various sized articles, is connected to a front end 21 of the shaft 12 for holding an article H to be tested, in this instance a platform 22 of a transistor header assembly 23 containing a plurality of metallic leads 24 extending through and being glass sealed (not shown) to the platform. It is noted, however, that the adaptor may be of a type for holding either one or more metallic leads or wires, per se, as required for a particular test.

A sleeve 31 extends through a portion 30 of support 11 and has an opening 32 for receiving a plunger pin 33. A compression spring 34 is coiled about the pin 33 and extends between a sleeve shoulder 35 and an enlarged end portion 36 of shaft 37 which is connected to the pin 33. Mounted on the shaft 37 is a drop platform 38. A retainer plate 39 is connected to sleeve 31 by screws 40 for restraining the plaform 38 against upward movement under the urging of the compression spring 34. The lower portion of the sleeve 31 is supported by a cylindrical member 41.

In operation, a loading table 45 is vertically adjusted to a desired height with respect to adaptor 20 by an adjusting screw 46 connected to shaft 47, the desired height being determined by the length of the lead to be tested. Similarly, sleeve 31 is vertically adjusted by locating screw 48 in one of a plurality of spaced opening 49. A predetermined weighted unit 50, for ultimately applying a desired tensile force to the lead to be tested, is located on loading table 45. The weighted unit, which is of the vise type having a fixed jaw 51 and a jaw 52 movable through a screw (not shown) attached to an adjusting knob 53, is then attached quickly to and firmly holds the leads. The loading table 45 is pivotally mounted at 54 and is moved in a horizontal plane from beneath the weighted unit, causing the weighted unit to be freely suspended and unrestrained.

Motor 13 is started and its rotary motion is translated through cam wheel 14 and linkage 15 into oscillatory motion of shaft 12. It is noted at this itme that the shaft is rotated through a selected angle and back to its starting position and that the angle may be varied by merely changing the position of a cam linkage pin 57 within one of cam openings 58 which, in turn, changes the stroke of said linkage. In the instant embodiment, however, the shaft oscillates through an angle of 90° thereby imparting right angle bends to the leads under test, each 1/10 bend of the leads being recorded on counter 19 as each nib 17 of rotating cam wheel 14 strikes the limit switch 18 which, in turn, pulses the counter.

Upon a fracture of the tested leads, weighted unit 50 falls upon the spring-loaded drop platform 38 which causes spring 34 to compress, and the platform and pin to descend. An end portion 60 of pin 33 strikes a limit switch 61 extending in its path, to stop the counter 19 which shows the number of bends in increments recorded at the time the lead fractures. The motor is stopped, the counter is reset, and the fractured lead is replaced with a new lead, thereby readying the fixture for another cycle.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A bend test fixture for testing at least one metallic lead used in a semiconductor device, which comprises a shaft adaptable for holding one end of the lead, a weighted unit connectable to and suspendable from the other end of the lead for applying a predetermined tensile force to the lead, a spring-loaded platform located beneath the weighted unit in spaced relationship thereto, a plunger pin depending from the platform, means for oscillating the shaft through a desired angle to bend the lead repeatedly, a counter, cam means connected to the oscillating means for pulsing the counter during each bend of the lead, and a switch located in the path of and operable by the movement of the plunger pin when the weighted unit falls upon the platform after a breakage of the lead, said switch causing the counter to stop recording the pulses imparted thereto by the cam means.

2. A bend test fixture for testing at least one metallic lead used in a semiconductor device, which comprises a shaft, an interchangeable adaptor connected to one end of the shaft for holding one end of the lead, a weighted unit connectable to the other end of the lead, a table for supporting the weighted unit while connecting it to said other end of the lead and being pivotally movable in a horizontal plane for causing the weighted unit to suspend freely from the lead for applying a predetermined tensile force to the lead, means for adjusting the vertical distance between said table and adaptor for testing various length leads, a spring-loaded platform located beneath the table in spaced relationship to the weighted unit after it has been freed from the table, a plunger pin depending from the platform, means for oscillating the shaft through a desired angle to bend the lead repeatedly, a counter, cam means connected to the oscillating means for pulsing the counter during each bend of the lead, and a switch located in the path of and operable by the movement of the plunger pin when the weighted unit falls upon the platform after a breakage of the lead, said switch causing the counter to stop recording the pulses imparted thereto by the cam means.

3. A bend test fixture for testing at least one metallic lead used in a semiconductor device, which comprises a shaft adaptable for holding one end of the lead, a weighted unit connectable to and suspendable from the other end of the lead for applying a predetermined tensile force to the lead, a spring-loaded platform located beneath the weighted unit in spaced relationship thereto, a plunger pin depending from the platform, means for oscillating the shaft through a desired angle to bend the lead repeatedly and said oscillating means including a rotatable cam wheel, a counter, a first switch cooperatively associated with the counter and being pulsed by the cam wheel to record the number of bends in the lead, and a second switch cooperatively associated with the counter and located in the path of and operable by the movement of the plunger pin when the weighted unit falls upon the platform after a breakage of the lead, said second switch causing the counter to stop recording the pulses imparted thereto by the cam wheel and first switch.

4. A bend test fixture according to claim 3 in which the weighted unit includes a fixed member, a movable member, and a screw connected to the movable member for moving it to and from the fixed member for securing and releasing the lead.

5. A bend test fixture according to claim 3 in which the oscillating means includes a motor for rotating the cam wheel and an eccentric linkage connected between the cam wheel and the shaft for translating the rotary motion of the motor into oscillatory motion of the shaft through a predetermined angle.

6. A bend test fixture according to claim 5 in which the lateral surface of the cam wheel is provided with a plurality of openings for receiving the eccentric linkage therein at different positions to oscillate the shaft through a selected angle, the number of said openings determining the number of selectable angles.

References Cited by the Examiner

UNITED STATES PATENTS

| | | | |
|---|---|---|---|
| 1,499,546 | 7/24 | Oxley | 73—91 |
| 2,494,595 | 1/50 | Taylor et al. | 73—100 X |
| 2,496,029 | 1/50 | White et al. | 73—100 X |
| 2,916,912 | 12/59 | Gibson | 73—91 |
| 3,065,632 | 11/62 | Crane et al. | 73—91 |

OTHER REFERENCES

Article entitled "Textile Testing in Germany," by Schiefer et al., from Textile Research Journal, February 1948, pages 89–94.

RICHARD C. QUEISSER, *Primary Examiner.*

ROBERT L. EVANS, *Examiner.*